Feb. 18, 1936.    H. THOMASMA    2,031,344

DOORLOCK

Original Filed March 12, 1934    2 Sheets-Sheet 1

Inventor
Harry Thomasma
By Liverance
Van Antwerp
Attorneys

Feb. 18, 1936.                 H. THOMASMA                 2,031,344
                                 DOORLOCK
                    Original Filed March 12, 1934    2 Sheets-Sheet 2
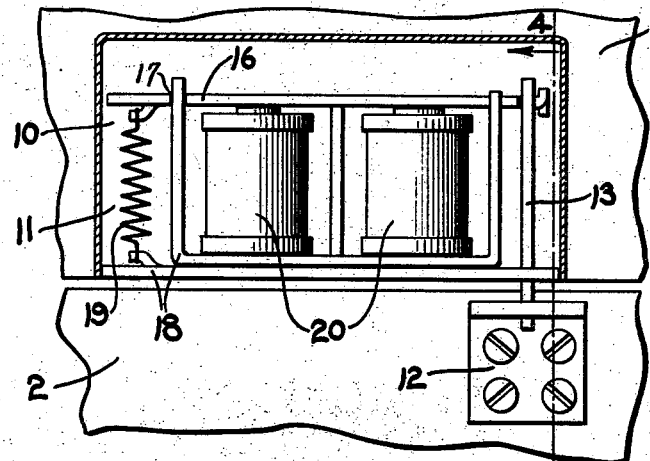
Fig. 3.
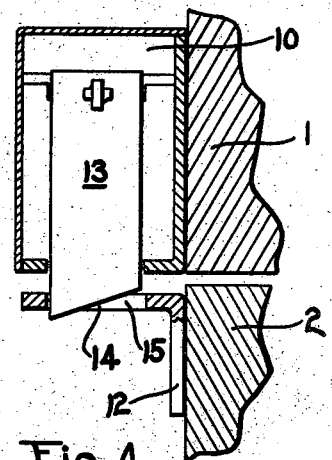
Fig. 4.
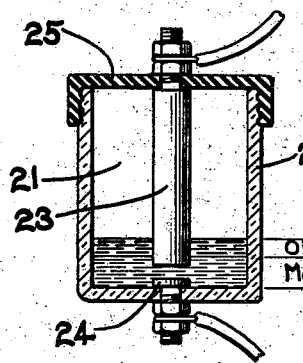
Fig. 5.
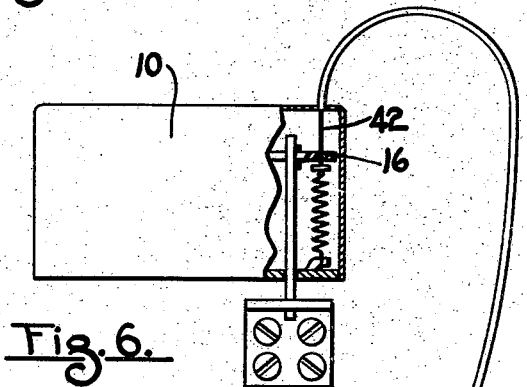
Fig. 6.
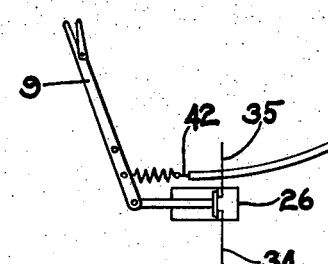
Inventor
Harry Thomasma
By
Attorneys Patented Feb. 18, 1936

2,031,344

UNITED STATES PATENT OFFICE 2,031,344

DOORLOCK

Harry Thomasma, Grand Rapids, Mich.

Application March 12, 1934, Serial No. 715,061
Renewed January 14, 1936

6 Claims. (Cl. 180—82)

This invention relates to improvements in vehicle door locks and more particularly to automatic locks for the doors of automobiles.

An object of the invention is to automatically maintain the doors of an automobile locked in closed position when the automobile is being driven or when certain control parts of the automobile are in position so that the automobile can be driven on the road. An advantage of this automatic door lock is to prevent the doors from being inadvertently opened while the automobile is in motion and to have the automatic locks under control of the driver of the automobile so that the doors may be unlocked at will and will automatically unlock by the usual movement of certain control parts of the automobile when it is not in motion.

Another object of the invention is to provide manually operable means for actuating the door locks to lock the doors in closed position when the automobile is standing.

Another object of the invention is to provide automatic means which will unlock the doors of the automobile when it assumes an angle greater than in normal driving conditions so that in case of accident in which the automobile may be tipped on its side or to a dangerous angle the door locks are automatically unlocked and the doors may be readily opened.

Another object of the invention is to associate the engine ignition circuit with the same means which acts when the automobile assumes an angle greater than normal whereby the ignition circuit will be broken to stop operation of the engine in case of accident and to prevent fire by reason of misdirected electric circuit. This circuit breaker may be used in the ignition circuit without being associated with the door locks.

The invention provides various new and useful features of construction and arrangement as hereinafter more fully described and particularly pointed out in the claims reference being had to the accompanying drawings, in which Fig. 1 is a diagrammatic plan view of an automobile, partially in section, showing the structure of this invention applied thereto.

Fig. 3 is an elevation of one of the door locks with the casing thereof in section and applied in operative position to a door.

Fig. 4 is a sectional elevation on the line 4—4 of Fig. 3.

Fig. 5 is a sectional elevation of the automatic level cutout switch, and

Fig. 6 illustrates a modification of the invention in which mechanical means are utilized to disengage the door locks.

Like numbers refer to like parts in all the figures.

Figure 1:
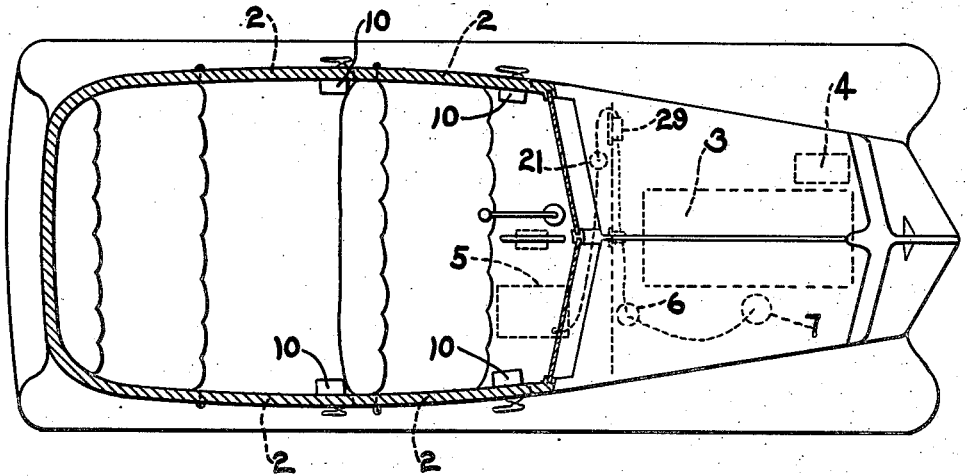
Figure 2:
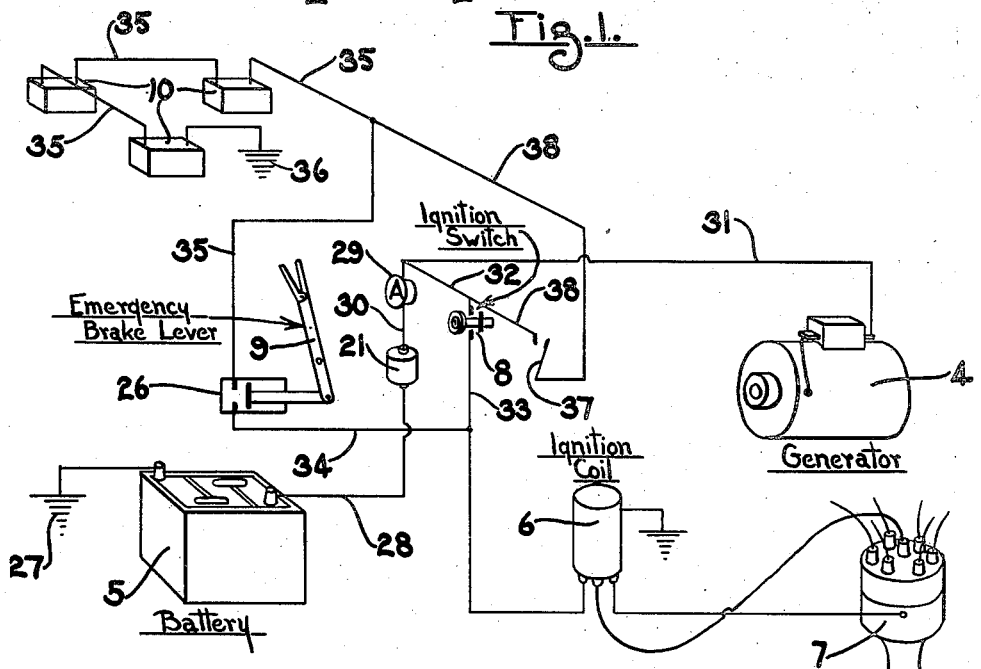
Fig. 2 is an electric wiring diagram showing the essential parts of the automobile and this invention with the electrical connections therebetween.

1 represents the body of an automobile having a plurality of doors 2. The automobile has the conventional engine 3 which is provided with an electric generator 4 by which the storage battery 5 is charged when the engine is running. The engine 3, being of the internal combustion type, has the usual ignition apparatus including an ignition coil 6 and a distributor 7. The conventional switch 8 is provided with means by which the ignition circuit is opened or closed commonly called "off" or "on". The automobile has the usual brakes including the so-called "emergency brakes" which are operated by an emergency brake lever 9. The aforementioned parts are conventional and are customarily a part of the present day automobile.

Each of the doors 2 of the automobile is provided with an automatic lock 10 which is a part of the present invention. These locks are electrically operated and comprise a body 11 fastened to the body 1 and a strike plate 12 fastened to a door 2 of the automobile. If preferred the mounting of these parts may be reversed and the lock may be mounted on a door of the automobile and the strike plate on the body thereof.

The lock comprises a bolt 13 which engages the strike plate 12. Its engaging end is inclined at 14 so that in closing movement of the door the lock bolt will be lifted by engagement by the strike plate and the strike plate has an opening 15 into which the end of the lock bolt 13 enters in locked position.

The lock bolt 13 is connected to an arm 16 which is pivoted at 17 to a part of the frame 18 of the lock and has a spring 19 attached to the arm 16 and also to the frame 18 which spring tends to retract the lock bolt 13 and move it out of engagement with the strike plate 12.

The arm 16 also serves as an armature which is attracted by the electromagnets 20 when they are electrically energized, as hereafter described, which will extend the bolt 13 into a position to engage the strike plate 12.

A device to break the electric circuit when tipped considerably from a normal position, which may be termed the "level switch" 21 is utilized in the circuit and fixed to some suitable part of the automobile so that it will tip with the automobile.

It comprises a cup shaped body 22 having spaced apart electrodes 23 and 24 therein. The electrode 24 is mounted on the body 22 and the electrode 23 is mounted on a cap 25 of non-conducting material. Mercury is contained in the body 22 of sufficient quantity to close the gap between the electrodes 23 and 24 when the device is in normal position and thus forms a conductor between the electrodes so that electric current may flow. When the level switch is tipped to an angle greater than a predetermined degree the level of the mercury in the body 22 will be below the electrode 23 and will break circuit between the electrodes 23 and 24. Oil is contained in the body, and because of differences in specific gravity between it and the mercury it will remain above the mercury and tends to prevent arcing of the current when the circuit is broken.

An electric switch 26 is connected to be opened and closed by movement of the emergency brake lever 9 and may be termed the "brake switch". This switch is so connected to the emergency brake lever that it will be closed when the lever is in position to release the emergency brakes as when the automobile is in motion and will be opened when the lever is moved to position to apply the brakes to stop the automobile or retain it from motion.

In the embodiment of the invention herein shown the so-called single wire system is used in which one terminal of the battery 5 is grounded at 27 and the electrical devices which utilize current furnished by the battery are also grounded in a conventional manner. By this system only one conducting wire is used to carry the electrical current. It is to be understood that a two wire circuit can be substituted if desired. In the construction shown current from the battery 5 is led to one of the electrodes of the level switch 21 by a conductor 28 and from the conductor 28 to the conventional ammeter 29 by a conductor 30. The generator 4, when operating, furnishes current by the conductor 31 to the ammeter and the current used by the electrical device is derived from either the battery or the generator and comes from the circuit having the greater potential.

A conductor 32 leads from the source of current supply and a conductor 33 is electrically connected to the conductor 32 and has the ignition switch inserted in it. This conductor 33 supplies current to the ignition device of the engine including the ignition coil 6 and the distributor 7 in the usual manner and needs no further description.

A conductor 34 connects with the conductor 33 and leads to the brake switch 26 and a conductor 35 extends from the brake switch 26 and leads to the door locks 10 and supplies current to the electro-magnets 20 thereof. As shown, the door locks 10 are connected in series with the conductor 35 which extends from one to the other so that they are all simultaneously operated when current is supplied. If preferred the alternate parallel type of current supply may be substituted. The circuit to the battery from the locks 10 is completed by means of a ground connection 36.

A so-called "lock switch" 37 is conveniently arranged for manual operation and is connected to make and break a circuit in the conductor 38 which joins the conductor 32 leading from the source of electric current and extends to the conductor 35 leading to the locks 10 and by means of this lock switch 37 current may be supplied to actuate the locks 10 regardless of the position of the brake switch 26.

*Operation*

This device in operation, and when the automobile is within the range of angles considered normal, will automatically lock the doors of the automobile in closed position when the ignition switch 8 is closed and the emergency brake lever 9 is in released position closing the brake switch 26 which is the position of these parts when the automobile is in movement. In this condition current is supplied from the battery 5 through the conductor 28, through the level switch 21, through the conductor 30 and ammeter 29, through the conductor 32, through the closed ignition switch 8 and the conductor 33, through the conductor 34, through the closed brake switch 26, through the conductor 35, which energizes the magnets 20, and to the ground 36.

When the magnets 20 of the respective locks 10 are thus energized the armatures 16 will be attracted toward them and will extend the lock bolts 13 so that they will enter the recesses 15 of the strike plates 12 which will lock the doors 2 in closed positions.

It is desired that the doors shall be thus locked when the automobile is moving but shall be immediately and automatically unlocked when the automobile is standing and since it is customary to apply the emergency brake when the automobile is stopped, movement of the emergency brake lever 9 to apply the brakes moves the brake switch 26 to open position and breaks the electric circuit to the locks 10 and deenergizes the magnets 20 which releases the armatures 16 and permits the springs 19 to move the armatures 16 and retract the lock bolts 13 thereby unlocking the doors 2.

This interrupting of the current to the locks 10 does not interfere with the ignition current and therefore the engine may continue to run when the doors are unlocked. However, to prevent waste of electric current when the car is left standing for a considerable time with the ignition switch in off position and the engine not running and with the emergency brake released as is frequently done when the car is left in a garage for example, the ignition switch controls the supply of current to the door locks so that it is only when the car is in running condition with the ignition switch turned on that the door locks will be effective.

To enable the doors to be locked electrically when the ignition switch is in off position and the engine not running, which is desirable under some conditions, the manual lock switch 37 is closed which completes the circuit from the source of supply through the conductor 38 to the conductor 35 and energizes the magnets 20 of the locks which acts to lock the doors as previously described. It is not intended that this lock switch 37 be closed sufficiently long to consume any great amount of current from the battery.

In case of accident, which usually upsets the automobile or tilts it to a dangerous angle beyond what may be considered as the normal driving angle, it is imperative that the doors be unlocked so that the occupants may readily free themselves and also under such conditions it is desirable that the operation of the engine be stopped and particularly that the electric current to the engine be broken to avoid short circuits which might cause fire. When the automobile assumes such an abnormal angle the mercury in the body of the level switch 21 will flow to break the electrical circuit with the electrode 23 which interrupts the flow of current both to the door locks 10 and to the ignition system thus releasing the locks 10 and stopping ignition in the engine which will cause the engine to stop operation. This level switch has a desirable purpose on an automobile not equipped with the door locks wherein it may be used with great practicability to interrupt the ignition circuit to the engine in case of accident.

To avoid the possibility of non-release of the door locks when the magnets 20 are deenergized, the mechanical releasing means illustrated in Fig. 6 may be utilized. This consists of a flexible power transmitter 40 attached to the brake lever 9 and extending into the door lock 10 and arranged to mechanically move the armature 16 to retract the lock bolt 13 by the same movement of the lever 9 which moves the switch 26 to break the circuit to the locks. By this means, when the magnets 20 are deenergized, the springs 19 are not entirely depended upon to move the armature 16 but the mechanical power transmitter 40 positively serves to disengage the locks. The specific power transmitter 40 shown consists of a flexible tube 41 through which a flexible wire 42 extends, which wire is connected at one end to the brake lever 9 and at the other end to the armature 16.

The invention is defined in the appended claims and is to be considered comprehensive of all forms of structure coming within their scope.

I claim:

1. The combination with an automobile having a door and a control member to be moved to one position when the automobile is moving and to another position when the automobile is standing, of a lock for said door, means actuated by said control member to lock said lock when said control member is adjusted for the automobile to move, said means acting to release said lock when the control member is adjusted for the automobile to stand and means for rendering the first mentioned means ineffective whenever the automobile is tilted to a predetermined angle.

2. The combination with an automible having a door, a brake lever movable to an operative and to an inoperative position, of a door lock, means for locking and releasing said lock associated with said brake lever and acting to lock said door lock when the brake lever is in an inoperative position, said means acting to release said door lock when the brake lever is in an operative position, manual means for locking and unlocking the door lock and automatic means for rendering both the manual means and the means associated with the brake lever ineffective whenever the automobile is tilted to a predetermined angle.

3. The combination with an automobile having a door, an engine, an electric ignition means for said engine, a brake lever, of a lock for said door, electrical means to actuate said door lock, a manual electrical switch associated with both said electric ignition means and said electric door lock actuating means and acting to simultaneously make or break the circuit to both of said electric means, and an electric switch in the electric circuit of said door lock means and independent of the electric circuit of said ignition means, said last named electric switch being actuated by said brake lever and acting to close the electric circuit to said door lock when the brake lever is in brake release position and to open said circuit when the brake lever is in brake applied position.

4. The elements in combination defined in claim 3, in which closing the electric circuit to said door lock acts to lock said lock and opening of said circuit acts to release said lock.

5. The elements in combination defined in claim 3, combined with automatic means for breaking the electric circuit to both of said electric ignition means and said electric lock means when the automobile is tipped to an abnormal angle.

6. The combination with an automobile having a door, a brake lever movable to applied position and to released position, and a constant source of electric energy, of an electric door lock for said door acting when energized by electric current to lock the door in closed position and when deenergized to unlock the door, an electric conductor to supply current from said source of energy to said door lock, an electric switch in said conductor, means actuated by said brake lever to close said switch when the brake lever is in released position and to open said switch when the brake lever is in applied position, an electric circuit from said source of energy to said door lock arranged to supply current to said door lock irrespective of the position of said brake lever operated switch and a manual switch in said last named circuit.

HARRY THOMASMA.